United States Patent
Ning et al.

(10) Patent No.: US 8,422,202 B2
(45) Date of Patent: Apr. 16, 2013

(54) CAPACITOR AND METHOD FOR MANUFACTURING THE SAME

(75) Inventors: Tailu Ning, Saitama (JP); Michiko Shingai, Saitama (JP)

(73) Assignee: Shin-Etsu Polymer Co., Ltd., Tokyo (JP)

( * ) Notice: Subject to any disclaimer, the term of this patent is extended or adjusted under 35 U.S.C. 154(b) by 251 days.

(21) Appl. No.: 12/989,199

(22) PCT Filed: Apr. 17, 2009

(86) PCT No.: PCT/JP2009/057764
§ 371 (c)(1),
(2), (4) Date: Oct. 22, 2010

(87) PCT Pub. No.: WO2009/133776
PCT Pub. Date: Nov. 5, 2009

(65) Prior Publication Data
US 2011/0051323 A1    Mar. 3, 2011

(30) Foreign Application Priority Data
Apr. 28, 2008   (JP) .................................. 2008-117194

(51) Int. Cl.
*H01G 9/04*      (2006.01)
(52) U.S. Cl.
USPC ........... 361/528; 361/523; 361/525; 361/529; 361/517; 361/519
(58) Field of Classification Search .................. 361/528, 361/516–519, 523–525, 429, 530, 535–536, 361/540–541
See application file for complete search history.

(56) References Cited

U.S. PATENT DOCUMENTS

| 4,780,796 | A | | 10/1988 | Fukuda et al. ................. 361/433 |
| 6,139,592 | A | * | 10/2000 | Kamigawa et al. .......... 29/25.03 |
| 7,666,326 | B2 | * | 2/2010 | Yoshida et al. ............... 252/500 |

FOREIGN PATENT DOCUMENTS

| JP | 63-158829 | 7/1988 |
| JP | 63-173313 | 7/1988 |
| JP | 11-145007 | 5/1999 |
| JP | 2000-124074 | 4/2000 |
| JP | 2000-331889 | 11/2000 |
| JP | 2003-037024 | 2/2003 |
| JP | 2005-109252 | 4/2005 |
| WO | WO 2007/091656 | 8/2007 |
| WO | WO 2007/097364 | 8/2007 |

OTHER PUBLICATIONS

International Search Report and Written Opinion mailed Jul. 14, 2009 in corresponding PCT International Application No. PCT/JP2009/057764.

* cited by examiner

*Primary Examiner* — Nguyen T Ha
(74) *Attorney, Agent, or Firm* — Ostrolenk Faber LLP

(57) ABSTRACT

A method for manufacturing a capacitor that enables a capacitor having a high degree of conductivity and minimal leakage current to be obtained with a high level of productivity. A method for manufacturing a capacitor (10) according to the present invention includes an electrolytic oxidation step of forming a dielectric layer (12) by electrolytically oxidizing the surface of an anode (11) composed of a valve metal, a cathode positioning step of positioning a cathode (13) composed of a conductor in an opposing arrangement on the surface of the dielectric layer (12), a solid electrolyte formation step of forming a solid electrolyte layer (14) between the dielectric layer (12) and the cathode (13) using a conductive polymer solution containing a π-conjugated conductive polymer and a polyanion, and an application step of performing a treatment in which a direct current voltage is applied between the anode (11) and the cathode (13).

21 Claims, 1 Drawing Sheet

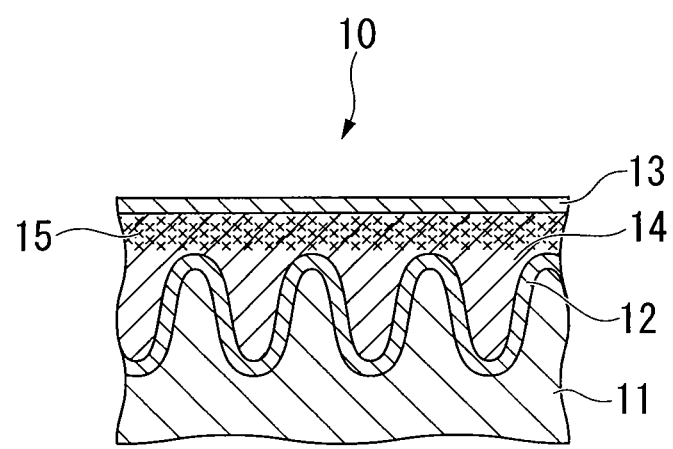

CAPACITOR AND METHOD FOR MANUFACTURING THE SAME

CROSS-REFERENCE TO RELATED APPLICATIONS

The present application is a 35 U.S.C. §§371 national phase conversion of PCT/JP2009/057764, filed Apr. 17, 2009, which claims priority of Japanese Patent Application No. 2008-117194, filed Apr. 28, 2008, the contents of which are incorporated herein by reference. The PCT International Application was published in the Japanese language.

TECHNICAL FIELD

The present invention relates to a capacitor such as an aluminum electrolytic capacitor, a tantalum electrolytic capacitor or a niobium electrolytic capacitor, and a method for manufacturing the same.

Priority is claimed on Japanese Patent Application No. 2008-117194, filed Apr. 28, 2008, the content of which is incorporated herein by reference.

BACKGROUND ART

In recent years, the digitalization of electronic equipment has been accompanied by a growing demand for reductions in the high-frequency region impedance (the equivalent series resistance: ESR) of the capacitors used in the electronic equipment. Conventionally, in order to satisfy these demands, capacitors have been used in which an oxide film of a valve metal such as aluminum, tantalum or niobium is used as a dielectric layer, and a solid electrolyte layer of a π-conjugated conductive polymer such as a polypyrrole or a polythiophene is formed on the surface of the dielectric layer.

As disclosed in Patent Document 1, the structures of these capacitors generally include an anode composed of a valve metal and having unevenness formed in the surface thereof, a dielectric layer formed by oxidizing the surface of the anode, a cathode composed of a conductor, and a solid electrolyte layer formed between the dielectric layer and the cathode.

Widely known methods for forming a solid electrolyte layer of a π-conjugated conductive polymer include electrolytic polymerization methods (see Patent Document 2) and chemical oxidative polymerization methods (see Patent Document 3).

PRIOR ART DOCUMENTS

Patent Documents
[Patent Document 1]
Japanese Laid-Open Patent Application No. 2003-37024
[Patent Document 2]
Japanese Unexamined Patent Application, First Publication No. Sho 63-158829
[Patent Document 3]
Japanese Unexamined Patent Application, First Publication No. Sho 63-173313

DISCLOSURE OF INVENTION

Problems to be Solved by the Invention

However, in an electrolytic polymerization method, an electrolytic conductive layer composed of manganese oxide must be formed in advance on the surface of the anode, which is not only extremely complex, but the resulting manganese oxide exhibits poor conductivity, which weakens the effect of using a highly conductive π-conjugated conductive polymer.

On the other hand, in a chemical oxidative polymerization method, the conductivity of the obtained capacitor is low, and the leakage current tends to be large. Moreover, in a chemical oxidative polymerization method, the polymerization time is very long, and repeated polymerizations must be performed to ensure a film of satisfactory thickness, meaning the production efficiency for the capacitor is poor.

An object of the present invention is to provide a capacitor that exhibits a high degree of conductivity and minimal leakage current, and can be obtained with a high level of productivity. Further, another object of the present invention is to provide a method for manufacturing a capacitor that enables a capacitor having a high degree of conductivity and minimal leakage current to be obtained with a high level of productivity.

Means to Solve the Problems

In other words, the present invention includes the aspects described below.

[1] A capacitor having an anode composed of a valve metal, a dielectric layer formed by oxidizing the surface of the anode, a cathode composed of a conductor, and a solid electrolyte layer that is formed between the dielectric layer and the cathode and contains a π-conjugated conductive polymer and a polyanion, wherein a treatment is performed in which a direct current voltage is applied between the anode and the cathode.

[2] The capacitor according to [1] above, wherein the solid electrolyte layer further contains a resin component besides the π-conjugated conductive polymer and the polyanion.

[3] A method for manufacturing a capacitor including:
an electrolytic oxidation step of forming a dielectric layer by electrolytically oxidizing the surface of an anode composed of a valve metal,
a cathode positioning step of positioning a cathode composed of a conductor in an opposing arrangement on the surface of the dielectric layer,
a solid electrolyte formation step of forming a solid electrolyte layer between the dielectric layer and the cathode using a conductive polymer solution containing a π-conjugated conductive polymer and a polyanion, and
an application step of performing a treatment in which a direct current voltage is applied between the anode and the cathode.

[4] The method for manufacturing a capacitor according to [3] above, wherein the direct current voltage in the application step is not less than 50% of the rated voltage of the obtained capacitor.

[5] The method for manufacturing a capacitor according to [3] or [4] above, wherein the application step is performed under an atmosphere of not less than 35° C.

[6] The method for manufacturing a capacitor according to any one of [3] to [5] above, wherein the application step is performed within a solution containing an organic solvent and a salt.

Effect Of The Invention

A capacitor of the present invention has a high degree of conductivity and minimal leakage current, and can be obtained with a high level of productivity.

A method for manufacturing a capacitor according to the present invention enables a capacitor having a high degree of conductivity and minimal leakage current to be obtained with a high level of productivity.

BRIEF DESCRIPTION OF THE DRAWINGS

FIG. 1 is a cross-sectional view illustrating one embodiment of a capacitor of the present invention.

BEST MODE FOR CARRYING OUT THE INVENTION

[Capacitor]

An embodiment of a capacitor of the present invention is described below.

FIG. 1 is a diagram illustrating the structure of the capacitor of this embodiment. This capacitor 10 includes an anode 11 composed of a valve metal, a dielectric layer 12 that is formed by oxidation of the surface of the anode 11, a cathode 13 composed of a conductor, and a solid electrolyte layer 14 that is formed between the dielectric layer 12 and the cathode 13. Further, a separator 15 is disposed between the dielectric layer 12 and the cathode 13.

As described below, the capacitor 10 is subjected to a treatment in which a direct current voltage is applied between the anode 11 and the cathode 13.

<Anode>

Examples of the valve metal that constitutes the anode 11 include aluminum, tantalum, niobium, titanium, hafnium, zirconium, zinc, tungsten, bismuth and antimony. Of these, aluminum, tantalum and niobium are preferred.

Specific examples of the anode 11 include anodes prepared by etching an aluminum foil to increase the surface area, and anodes composed of a porous sintered body of tantalum particles or niobium particles. These types of anodes 11 have unevenness formed within the surface.

<Dielectric Layer>

The dielectric layer 12 is formed, for example, by anodic oxidation of the surface of the anode 11 within an electrolyte solution such as an aqueous solution of ammonium adipate. Accordingly, as illustrated in FIG. 1, the dielectric layer 12 conforms and follows the unevenness within the surface of the anode 11.

<Cathode>

The cathode 13 is composed of a conductor such as carbon, silver or aluminum or the like. For example, a cathode 13 composed of aluminum can be formed from an aluminum foil.

<Separator>

Examples of materials that can be used as the separator 15 include nonwoven fabrics composed of one or more types of fiber such as cellulose fibers, glass fibers, polypropylene fibers, polyester fibers and polyamide fibers, and carbonized nonwoven fabrics prepared by carbonizing these nonwoven fabrics.

<Solid Electrolyte Layer>

The solid electrolyte layer 14 is a layer that contains a π-conjugated conductive polymer and a polyanion as essential components.

[π-Conjugated Conductive Polymer]

The π-conjugated conductive polymer can use any organic polymer in which the main chain is composed of a π-conjugated system. Examples include polypyrroles, polythiophenes, polyacetylenes, polyphenylenes, polyphenylenevinylenes, polyanilines, polyacenes, polythiophenevinylenes, and copolymers thereof.

Specific examples of this type of π-conjugated conductive polymer include polypyrrole, poly(N-methylpyrrole), poly(3-methylpyrrole), poly(3-ethylpyrrole), poly(3-n-propylpyrrole), poly(3-butylpyrrole), poly(3-octylpyrrole), poly(3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), poly(3-ethoxypyrrole), poly(3-butoxypyrrole), poly(3-hexyloxypyrrole), poly(3-methyl-4-hexyloxypyrrole), polythiophene, poly(3-methylthiophene), poly(3-ethylthiophene), poly(3-propylthiophene), poly(3-butylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3-chlorothiophene), poly(3-iodothiophene), poly(3-cyanothiophene), poly(3-phenylthiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3,4-dihydroxythiophene), poly(3,4-dimethoxythiophene), poly(3,4-diethoxythiophene), poly(3,4-dipropoxythiophene), poly(3,4-dibutoxythiophene), poly(3,4-dihexyloxythiophene), poly(3,4-diheptyloxythiophene), poly(3,4-dioctyloxythiophene), poly(3,4-didecyloxythiophene), poly(3,4-didodecyloxythiophene), poly(3,4-ethylenedioxythiophene), poly(3,4-propylenedioxythiophene), poly(3,4-butenedioxythiophene), poly(3-methyl-4-methoxythiophene), poly(3-methyl-4-ethoxythiophene), poly(3-carboxythiophene), poly(3-methyl-4-carboxythiophene), poly(3-methyl-4-carboxyethylthiophene), poly(3-methyl-4-carboxybutylthiophene), polyaniline, poly(2-methylaniline), poly(3-isobutylaniline), poly(2-anilinesulfonic acid), and poly(3-anilinesulfonic acid).

Of these, a (co)polymer composed of either one or two compounds selected from among polypyrrole, polythiophene, poly(N-methylpyrrole), poly(3-methylthiophene), poly(3-methoxythiophene) and poly(3,4-ethylenedioxythiophene) can be used particularly favorably in terms of the resistance and the reactivity. Moreover, polypyrrole and poly(3,4-ethylenedioxythiophene) yield a greater increase in conductivity and also offer improved heat resistance, and are therefore particularly desirable.

In order to ensure satisfactory manifestation of the function of the capacitor 10, the amount of the π-conjugated conductive polymer within the solid electrolyte layer 14 is preferably not less than 1% by mass, and is more preferably 5% by mass or greater.

[Polyanion]

The polyanion is a homopolymer or copolymer selected from amongst substituted or unsubstituted polyalkylenes, substituted or unsubstituted polyalkenylenes, substituted or unsubstituted polyimides, substituted or unsubstituted polyamides and substituted or unsubstituted polyesters, and contains structural units having an anion group, and if required, structural units having no anion group.

The polyanion not only makes the π-conjugated conductive polymer soluble in the solvent, but also functions as a dopant for the π-conjugated conductive polymer.

The term "polyalkylene" describes a polymer in which the main chain is composed of repeating methylene units.

A "polyalkenylene" is a polymer composed of structural units having one or more unsaturated bonds (vinyl groups) within the main chain. Of these, substituted or unsubstituted butenylenes are preferred because they exhibit an interaction between the unsaturated bonds and the π-conjugated conductive polymer, and are readily synthesized using a substituted or unsubstituted butadiene as the starting material.

Examples of the polyimides include polyimides formed from an anhydride such as pyromellitic dianhydride, biphenyl tetracarboxylic dianhydride, benzophenone tetracarboxylic dianhydride, 2,2',3,3'-tetracarboxydiphenyl ether dianhydride or 2,2'-[4,4'-di(dicarboxyphenyloxy)phenyl]propane dianhydride, and a diamine such as oxydiamine, para-phenylenediamine, meta-phenylenediamine or benzophenonediamine.

Examples of the polyamides include polyamide 6, polyamide 6,6 and polyamide 6,10 and the like.

Examples of the polyesters include polyethylene terephthalate and polybutylene terephthalate and the like.

In those cases where the polyanion includes substituents, examples of those substituents include alkyl groups, hydroxyl groups, amino groups, cyano groups, phenyl groups, phenol groups, ester groups, alkoxy groups and carbonyl groups. Considering factors such as the solubility of the polyanion in solvents, the heat resistance, and the compatibility of the polyanion with resins, alkyl groups, hydroxyl groups, phenol groups and ester groups are preferred.

Alkyl groups can improve the solubility and dispersibility of the polyanion in polar solvents or non-polar solvents, and can also improve the compatibility with, and dispersibility within resins, whereas hydroxyl groups can readily form hydrogen bonds with other hydrogen atoms or the like, thereby improving the solubility within organic solvents and the compatibility with, dispersibility within, and adhesion to resins. Moreover, cyano groups and hydroxyphenyl groups can improve the compatibility with, and solubility within polar resins, and can also enhance the heat resistance.

Of the above substituents, alkyl groups, hydroxyl groups, ester groups and cyano groups are preferred.

Examples of the alkyl groups include chain-like alkyl groups such as methyl, ethyl, propyl, butyl, isobutyl, t-butyl, pentyl, hexyl, octyl, decyl and dodecyl groups, and cycloalkyl groups such as cyclopropyl, cyclopentyl and cyclohexyl groups. Considering factors such as the solubility within organic solvents, the dispersibility within resins, and steric hindrance, alkyl groups of 1 to 12 carbon atoms are particularly preferred.

Examples of the hydroxyl groups include hydroxyl groups bonded directly to the main chain of the polyanion, and hydroxyl groups bonded to the main chain via other functional groups. Examples of these other functional groups include alkyl groups of 1 to 7 carbon atoms, alkenyl groups of 2 to 7 carbon atoms, amide groups and imide groups and the like. The hydroxyl groups may be substituted at either the terminal of these functional groups, or at non-terminal positions within the functional groups. Of these groups, hydroxyl groups bonded to the terminal of an alkyl group of 1 to 6 carbon atoms that is bonded to the main chain are particularly preferred in terms of the resulting compatibility with resins and solubility within organic solvents.

Examples of the ester groups include alkyl ester groups or aromatic ester groups bonded directly to the main chain of the polyanion, and alkyl ester groups or aromatic ester groups bonded to the main chain via other functional groups.

Examples of the cyano groups include cyano groups bonded directly to the main chain of the polyanion, cyano groups bonded to the terminal of an alkyl group of 1 to 7 carbon atoms that is bonded to the main chain of the polyanion, and cyano groups bonded to the terminal of an alkenyl group of 2 to 7 carbon atoms that is bonded to the main chain of the polyanion.

As the anion groups of the polyanion, any functional groups that are capable of causing the chemical oxidative doping of the π-conjugated conductive polymer may be used, but of such functional groups, from the viewpoints of the ease of manufacture and the stability, mono-substituted sulfate ester groups, mono-substituted phosphate ester groups, phosphoric acid groups, carboxyl groups and sulfo groups and the like are preferred. Moreover, in terms of the doping effect of the functional groups on the π-conjugated conductive polymer, sulfo groups and mono-substituted sulfate ester groups are particularly desirable.

Specific examples of the polyanion include polyvinyl sulfonic acid, polystyrene sulfonic acid, polyallyl sulfonic acid, polyacryl sulfonic acid, polymethacryl sulfonic acid, poly(2-acrylamido-2-methylpropane sulfonic acid), polyisoprene sulfonic acid and polyacrylic acid. The polyanion may be either a homopolymer of one of these polymers, or a copolymer of two or more of the above polymers.

Of these, polyacryl sulfonic acid and polymethacryl sulfonic acid are able to alleviate thermal decomposition of the π-conjugated conductive polymer by absorbing thermal energy and undergoing self-decomposition. Accordingly, these polyanions exhibit excellent heat resistance and environmental resistance.

[Resin Component]

The solid electrolyte layer 14 preferably also contains a resin component besides the π-conjugated conductive polymer and the polyanion (hereinafter simply referred to as "the resin component"), as this enables a further reduction in the leakage current.

Examples of the resin component include polyimides, polyamides, polyesters, polyethers, fluororesins, (meth) acrylic compounds containing one or more hydroxyl groups, (meth)acrylic compounds containing one or more alkoxy groups, and compounds containing one or more epoxy groups.

Examples of the polyimides include polyimides formed from an anhydride such as pyromellitic dianhydride, biphenyl tetracarboxylic dianhydride, benzophenone tetracarboxylic dianhydride, 2,2',3,3'-tetracarboxydiphenyl ether dianhydride or 2,2'-[4,4'-di(dicarboxyphenyloxy)phenyl]propane dianhydride, and a diamine such as oxydiamine, para-phenylenediamine, meta-phenylenediamine or benzophenonediamine.

Examples of the polyamides include polyamide 6, polyamide 6,6 and polyamide 6,10 and the like.

Examples of the polyesters include polyethylene terephthalate and polybutylene terephthalate and the like.

Examples of the polyethers include diethylene glycol, triethylene glycol, oligoethylene glycol, triethylene glycol monochlorohydrin, diethylene glycol monochlorohydrin, oligoethylene glycol monochlorohydrin, triethylene glycol monobromohydrin, diethylene glycol monobromohydrin, oligoethylene glycol monobromohydrin, polyethylene glycol, polyether, polyethylene oxide, triethylene glycol dimethyl ether, tetraethylene glycol dimethyl ether, diethylene glycol dimethyl ether, diethylene glycol diethyl ether, diethylene glycol dibutyl ether, dipropylene glycol, tripropylene glycol, polypropylene glycol, polypropylene dioxide, polyoxyethylene alkyl ethers, polyoxyethylene glycerol fatty acid esters, polyoxyethylene fatty acid amides, ethylene glycol di(meth)acrylate, diethylene glycol di(meth)acrylate, triethylene glycol di(meth)acrylate, polyethylene glycol di(meth) acrylate, neopentyl glycol di(meth)acrylate, ethylene oxide-modified trimethylolpropane triacrylate, ethylene oxide-modified pentaerythritol triacrylate and ethylene oxide-modified pentaerythritol tetraacrylate.

Examples of the fluororesins include polyvinylidene fluoride, polyvinyl fluoride, polytetrafluoroethylene, ethylenetetrafluoroethylene copolymers and polychlorotrifluoroethylene.

Examples of the (meth)acrylic compounds containing one or more hydroxyl groups include 2-hydroxyethyl methacrylate, 2-hydroxypropyl methacrylate, 2-hydroxyethyl acrylate, 2-hydroxypropyl acrylate and glycerol di(meth)acrylate.

Examples of the (meth)acrylic compounds containing one or more alkoxy groups include n-butoxyethyl methacrylate, n-butoxyethylene glycol methacrylate, methoxytriethylene glycol methacrylate, methoxypolyethylene glycol methacrylate, n-butoxyethyl acrylate, n-butoxyethylene glycol acrylate, methoxytriethylene glycol acrylate and methoxypolyethylene glycol acrylate.

Examples of the compounds containing one or more epoxy groups include glycidyl ethers such as ethylene glycol diglycidyl ether, glycidyl ether, diethylene glycol diglycidyl ether, triethylene glycol diglycidyl ether, polyethylene glycol diglycidyl ether, propylene glycol diglycidyl ether, tripropylene glycol diglycidyl ether, polypropylene glycol diglycidyl ether and glycerol diglycidyl ether, as well as glycidyl methacrylate.

Further, other compounds may also be used as the resin component, including triglycerols, polyvinylpyrrolidone, polyacrylamide, polyvinylacetamide, polyamide acid, polyacrylonitrile, polysilamine, polyvinyl alcohol, polyvinylphenol, polyvinyl butyral, polyvinyl acetate, polyvinyl chloride, epoxy resins, xylene resins, aramid resins and melamine resins.

The amount of the resin component within the solid electrolyte layer 14 is preferably within a range from 5 to 10,000 parts by mass, and more preferably from 10 to 5,000 parts by mass, per 100 parts by mass of the combination of the π-conjugated conductive polymer and the polyanion. If the amount of the resin component is less than 5 parts by mass, then the leakage current of the capacitor 10 may not decrease satisfactorily, whereas if the amount exceeds 10,000 parts by mass, then the conductivity of the solid electrolyte layer 14 tends to decrease and the ESR of the capacitor 10 tends to increase.

[Conductivity Improver]

In order to enable a further reduction in the ESR of the capacitor 10, the solid electrolyte layer 14 preferably also includes a conductivity improver that acts upon the π-conjugated conductive polymer to improve the conductivity of the solid electrolyte layer 14.

Examples of the conductivity improver include nitrogen-containing aromatic cyclic compounds, compounds containing two or more hydroxyl groups, compounds containing two or more carboxyl groups, compounds containing one or more hydroxyl groups and one or more carboxyl groups, compounds containing an amide group, compounds containing an imide group, lactam compounds, compounds containing a glycidyl group, silane coupling agents, and water-soluble organic solvents.

—Nitrogen-Containing Aromatic Cyclic Compounds

Examples of the nitrogen-containing aromatic cyclic compound include compounds containing a single nitrogen atom such as pyridines and derivatives thereof, compounds containing two nitrogen atoms such as imidazoles and derivatives thereof, pyrimidines and derivatives thereof, and pyrazines and derivatives thereof, and compounds containing three nitrogen atoms such as triazines and derivatives thereof. From the viewpoint of the solubility within solvents, pyridines and derivatives thereof, imidazoles and derivatives thereof, and pyrimidines and derivatives thereof are preferred.

Specific examples of the pyridines and derivatives thereof include pyridine, 2-methylpyridine, 3-methylpyridine, 4-methylpyridine, 4-ethylpyridine, N-vinylpyridine, 2,4-dimethylpyridine, 2,4,6-trimethylpyridine, 3-cyano-5-methylpyridine, 2-pyridinecarboxylic acid, 6-methyl-2-pyridinecarboxylic acid, 4-pyridinecarboxaldehyde, 4-aminopyridine, 2,3-diaminopyridine, 2,6-diaminopyridine, 2,6-diamino-4-methylpyridine, 4-hydroxypyridine, 4-pyridinemethanol, 2,6-dihydroxypyridine, 2,6-pyridinedimethanol, methyl 6-hydroxynicotinate, 2-hydroxy-5-pyridinemethanol, ethyl 6-hydroxynicotinate, 4-pyridinemethanol, 4-pyridineethanol, 2-phenylpyridine, 3-methylquinoline, 3-ethylquinoline, quinolinol, 2,3-cyclopentenopyridine, 2,3-cyclohexanopyridine, 1,2-di(4-pyridyl)ethane, 1,2-di(4-pyridyl)propane, 2-pyridinecarboxaldehyde, 2-pyridinecarbonitrile, 2,3-pyridinedicarboxylic acid, 2,4-pyridinedicarboxylic acid, 2,5-pyridinedicarboxylic acid, 2,6-pyridinedicarboxylic acid and 3-pyridinesulfonic acid.

Specific examples of the imidazoles and derivatives thereof include imidazole, 2-methylimidazole, 2-propylimidazole, 2-undecylimidazole, 2-phenylimidazole, N-methylimidazole, N-vinylimidazole, N-allylimidazole, 1-(2-hydroxyethyl)imidazole (N-hydroxyethylimidazole), 2-ethyl-4-methylimidazole, 1,2-dimethylimidazole, 1-benzyl-2-methylimidazole, 1-benzyl-2-phenylimidazole, 1-cyanoethyl-2-methylimidazole, 1-cyanoethyl-2-ethyl-4-methylimidazole, 2-phenyl-4,5-dihydroxymethylimidazole, 1-acetylimidazole, 4,5-imidazoledicarboxylic acid, dimethyl 4,5-imidazoledicarboxylate, benzimidazole, 2-aminobenzimidazole, 2-aminobenzimidazole-2-sulfonic acid, 2-amino-1-methylbenzimidazole, 2-hydroxybenzimidazole and 2-(2-pyridyl)benzimidazole.

Specific examples of the pyrimidines and derivatives thereof include 2-amino-4-chloro-6-methylpyrimidine, 2-amino-6-chloro-4-methoxypyrimidine, 2-amino-4,6-dichloropyrimidine, 2-amino-4,6-dihydroxypyrimidine, 2-amino-4,6-dimethylpyrimidine, 2-amino-4,6-dimethoxypyrimidine, 2-aminopyrimidine, 2-amino-4-methylpyrimidine, 4,6-dihydroxypyrimidine, 2,4-dihydroxypyrimidine-5-carboxylic acid, 2,4,6-triaminopyrimidine, 2,4-dimethoxypyrimidine, 2,4,5-trihydroxypyrimidine and 2,4-pyrimidinediol.

Specific examples of the pyrazines and derivatives thereof include pyrazine, 2-methylpyrazine, 2,5-dimethylpyrazine, pyrazinecarboxylic acid, 2,3-pyrazinedicarboxylic acid, 5-methylpyrazinecarboxylic acid, pyrazinamide, 5-methylpyrazinamide, 2-cyanopyrazine, aminopyrazine, 3-aminopyrazine-2-carboxylic acid, 2-ethyl-3-methylpyrazine, 2,3-dimethylpyrazine and 2,3-diethylpyrazine.

Specific examples of the triazines and derivatives thereof include 1,3,5-triazine, 2-amino-1,3,5-triazine, 3-amino-1,2,4-triazine, 2,4-diamino-6-phenyl-,3,5-triazine, 2,4,6-triamino-1,3,5-triazine, 2,4,6-tris(trifluoromethyl)-1,3,5-triazine, 2,4,6-tri-2-pyridyl-1,3,5-triazine, 3-(2pyridyl)-1,2,4-triazine-5,6-bis(4-phenylsulfonic acid) disodium salt, 3-(2-pyridyl)-5,6-diphenyl-1,2,4-triazine, 3-(2-pyridyl)-5,6-diphenyl-1,2,4-triazine -ρ,ρ'-disulfonic acid disodium salt and 2-hydroxy-4,6-dichloro-1,3,5-triazine.

The amount of the nitrogen-containing aromatic cyclic compound is preferably within a range from 0.1 to 100 mols, and more preferably from 0.5 to 30 mols, per 1 mol of anionic group units within the polyanion. From the viewpoints of the physical properties and conductivity of the solid electrolyte layer 14, this amount is most preferably within a range from 1 to 10 mols. If the amount of the nitrogen-containing aromatic cyclic compound is less than 0.1 mols, then the interaction between the nitrogen-containing aromatic cyclic compound and the polyanion and conjugated conductive polymer tends to weaken, and the resulting conductivity may be inadequate. In contrast, if the amount of the nitrogen-containing aromatic cyclic compound exceeds 100 mols, then the amount of the conjugated conductive polymer is reduced, which makes it difficult to achieve a satisfactory degree of conductivity, and may alter the physical properties of the solid electrolyte layer 14.

—Compounds Containing Two or More Hydroxyl Groups

Examples of the compound containing two or more hydroxyl groups include polyhydric aliphatic alcohols such as propylene glycol, 1,3-butylene glycol, 1,4-butylene glycol, D-glucose, D-glucitol, isoprene glycol, dimethylolpropionic acid, butanediol, 1,5-pentanediol, 1,6-hexanediol, 1,9-nonanediol, neopentyl glycol, trimethylolethane, trimethylolpropane, pentaerythritol, dipentaerythritol, thiodiethanol, glucose, tartaric acid, D-glucaric acid and glutaconic acid;

polymer alcohols such as cellulose, polysaccharides and sugar alcohols;

aromatic compounds such as 1,4-dihydroxybenzene, 1,3-dihydroxybenzene, 2,3-dihydroxy-1-pentadecylbenzene, 2,4-dihydroxyacetophenone, 2,5-dihydroxyacetophenone, 2,4-dihydroxybenzophenone, 2,6-dihydroxybenzophenone, 3,4-dihydroxybenzophenone, 3,5-dihydroxybenzophenone, 2,4'-dihydroxydiphenylsulfone, 2,2',5,5'-tetrahydroxydiphenylsulfone, 3,3',5,5'-tetramethyl-4,4'-dihydroxydiphenylsulfone, hydroxyquinonecarboxylic acid and salts thereof, 2,3-dihydroxybenzoic acid, 2,4-dihydroxybenzoic acid, 2,5-dihydroxybenzoic acid, 2,6-dihydroxybenzoic acid, 3,5-dihydroxybenzoic acid, 1,4-hydroquinonesulfonic acid and salts thereof, 4,5-hydroxybenzene-1,3-disulfonic acid and salts thereof, 1,5-dihydroxynaphthalene, 1,6-dihydroxynaphthalene, 2,6-dihydroxynaphthalene, 2,7-dihydroxynaphthalene, 2,3-dihydroxynaphthalene, 1,5-dihydroxynaphthalene-2,6-dicarboxylic acid, 1,6-dihydroxynaphthalene-2,5-dicarboxylic acid, 1,5-dihydroxynaphthoic acid, phenyl 1,4-dihydroxy-2-naphthoate, 4,5-dihydroxynaphthalene-2,7-disulfonic acid and salts thereof, 1,8-dihydroxy-3,6-naphthalenedisulfonic acid and salts thereof, 6,7-dihydroxy-2-naphthalenesulfonic acid and salts thereof, 1,2,3-trihydroxybenzene (pyrogallol), 1,2,4-trihydroxybenzene, 5-methyl-1,2,3-trihydroxybenzene, 5-ethyl-1,2,3-trihydroxybenzene, 5-propyl-1,2,3-trihydroxybenzene, trihydroxybenzoic acid, trihydroxyacetophenone, trihydroxybenzophenone, trihydroxybenzaldehyde, trihydroxyanthraquinone, 2,4,6-trihydroxybenzene, tetrahydroxy-p-benzoquinone, tetrahydroxyanthraquinone, methyl gallate and ethyl gallate; and potassium hydroquinone sulfonate.

The amount of the compound containing two or more hydroxyl groups is preferably within a range from 0.05 to 50 mols, and more preferably from 0.3 to 10 mols, per 1 mol of anionic group units within the polyanion. If the amount of the compound containing two or more hydroxyl groups is less than 0.05 mols per 1 mol of anionic group units within the polyanion, then the resulting conductivity and heat resistance may be inadequate. In contrast, if the amount of the compound containing two or more hydroxyl groups exceeds 50 mols per 1 mol of anionic group units within the polyanion, then the amount of the π-conjugated conductive polymer within the solid electrolyte layer 14 is reduced, which makes it difficult to achieve a satisfactory degree of conductivity, and may alter the physical properties of the solid electrolyte layer 14.

—Compounds Containing Two or More Carboxyl Groups

Examples of the compound containing two or more carboxyl groups include aliphatic carboxylic acid compounds such as maleic acid, fumaric acid, itaconic acid, citraconic acid, malonic acid, 1,4-butanedicarboxylic acid, succinic acid, tartaric acid, adipic acid, D-glucaric acid, glutaconic acid and citric acid;

aromatic carboxylic acid compounds containing at least one carboxyl group bonded to an aromatic ring, such as phthalic acid, terephthalic acid, isophthalic acid, tetrahydrophthalic anhydride, 5-sulfoisophthalic acid, 5-hydroxyisophthalic acid, methyltetrahydrophthalic anhydride, 4,4'-oxydiphthalic acid, biphenyltetracarboxylic dianhydride, benzophenonetetracarboxylic dianhydride, naphthalenedicarboxylic acid, trimellitic acid and pyromellitic acid; as well as diglycolic acid, oxydibutyric acid, thiodiacetic acid, thiodibutyric acid, iminodiacetic acid and iminobutyric acid.

The amount of the compound containing two or more carboxyl groups is preferably within a range from 0.1 to 30 mols, and more preferably from 0.3 to 10 mols, per 1 mol of anionic group units within the polyanion. If the amount of the compound containing two or more carboxyl groups is less than 0.1 mols per 1 mol of anionic group units within the polyanion, then the resulting conductivity and heat resistance may be inadequate. In contrast, if the amount of the compound containing two or more carboxyl groups exceeds 30 mols per 1 mol of anionic group units within the polyanion, then the amount of the π-conjugated conductive polymer within the solid electrolyte layer 14 is reduced, which makes it difficult to achieve a satisfactory degree of conductivity, and may alter the physical properties of the solid electrolyte layer 14.

—Compounds Containing One or More Hydroxyl Groups and One or More Carboxyl Groups Examples of the compound containing one or more hydroxyl groups and one or more carboxyl groups include tartaric acid, glyceric acid, dimethylolbutanoic acid, dimethylolpropanoic acid, D-glucaric acid and glutaconic acid.

The amount of the compound containing one or more hydroxyl groups and one or more carboxyl groups is preferably within a range from 1 to 5,000 parts by mass, and more preferably from 50 to 500 parts by mass, per 100 parts by mass of the combination of the polyanion and the π-conjugated conductive polymer. If the amount of the compound containing one or more hydroxyl groups and one or more carboxyl groups is less than 1 part by mass, then the resulting conductivity and heat resistance may be inadequate. In contrast, if the amount of the compound containing one or more hydroxyl groups and one or more carboxyl groups exceeds 5,000 parts by mass, then the amount of the π-conjugated conductive polymer within the solid electrolyte layer 14 is reduced, making it difficult to achieve a satisfactory degree of conductivity.

—Amide Compounds

The compound containing an amide group refers to monomolecular compounds containing an amide linkage represented by —CO—NH— (wherein the CO portion includes a double bond) within the molecule. In other words, examples of the amide compounds include compounds having a functional group at both terminals of the above amide linkage, compounds having a cyclic compound bonded to one terminal of the above linkage, urea and urea derivatives.

Specific examples of the amide compound include acetamide, malonamide, succinamide, maleamide, fumaramide, benzamide, naphthamide, phthalamide, isophthalamide, terephthalamide, nicotinamide, isonicotinamide, 2-furamide, formamide, N-methylformamide, propionamide, propiolamide, butyramide, isobutyramide, methacrylamide, palmitamide, stearamide, oleamide, oxamide, glutaramide, adipamide, cinnamamide, glucolamide, lactamide, glyceramide, tartaramide, citramide, glyoxylamide, pyruvamide, acetoacetamide, dimethylacetamide, benzylamide, anthranylamide, ethylenediaminetetraacetamide, diacetamide, triacetamide, dibenzamide, tribenzamide, rhodanine, urea, 1-acetyl-2-thiourea, biuret, butylurea, dibutylurea, 1,3-dimethylurea, 1,3-diethylurea, and derivatives thereof.

Furthermore, acrylamides may also be used as amide compound. Specific examples of these acrylamides include N-methylacrylamide, N-methylmethacrylamide, N-ethylacrylamide, N-ethylmethacrylamide, N,N-dimethylacrylamide, N,N-dimethylmethacrylamide, N,N-diethylacrylamide, N,N-diethylmethacrylamide, 2-hydroxyethylacrylamide, 2-hydroxyethylmethacrylamide, N-methylolacrylamide and N-methylolmethacrylamide.

The molecular weight of the amide compound is preferably within a range from 46 to 10,000, more preferably from 46 to 5,000, and still more preferably from 46 to 1,000.

The amount of the amide compound is preferably within a range from 1 to 5,000 parts by mass, and more preferably from 50 to 500 parts by mass, per 100 parts by mass of the combination of the polyanion and the π-conjugated conductive polymer. If the amount of the amide compound is less than 1 part by mass, then the conductivity and the heat resistance may be inadequate. Further, if the amount of the amide compound exceeds 5,000 parts by mass, then the amount of the π-conjugated conductive polymer within the solid electrolyte layer 14 is reduced, making it difficult to achieve a satisfactory degree of conductivity.

—Imide Compounds

As the amide compound, a monomolecular compound containing an imide linkage (hereinafter referred to as an imide compound) is preferred, as it yields a greater improvement in the conductivity. Examples of the imide compound, described in terms of the molecular skeleton, include phthalimide and phthalimide derivatives, succinimide and succinimide derivatives, benzimide and benzimide derivatives, maleimide and maleimide derivatives, and naphthalimide and naphthalimide derivatives.

Further, the imide compounds are classified as either aliphatic imides or aromatic imides or the like on the basis of the functional groups at the two terminals, and from the viewpoint of solubility, aliphatic imides are preferred.

Moreover, aliphatic imide compounds can be classified into saturated aliphatic imide compounds, which do not contain unsaturated bonds between the carbon atoms within the molecule, and unsaturated aliphatic imide compounds, which contain one or more unsaturated bonds between the carbon atoms within the molecule.

Saturated aliphatic imide compounds are compounds represented by the formula: $R^1$—CO—NH—CO—$R^2$, wherein $R^1$ and $R^2$ are both saturated hydrocarbon groups. Specific examples include cyclohexane-1,2-dicarboximide, allantoin, hydantoin, barbituric acid, alloxan, glutarimide, succinimide, 5-butylhydantoic acid, 5,5-dimethylhydantoin, 1-methylhydantoin, 1,5,5-trimethylhydantoin, 5-hydantoinacetic acid, N-hydroxy-5-norbornene-2,3-dicarboximide, semicarbazide, α,α-dimethyl-6-methylsuccinimide, bis[2-(succinimidooxycarbonyloxy)ethyl]sulfone, α-methyl-α-propylsuccinimide and cyclohexylimide.

Unsaturated aliphatic imide compounds are compounds represented by the formula: $R^1$—CO—NH—CO—$R^2$, wherein either one of, or both, $R^1$ and $R^2$ contain one or more unsaturated bonds. Specific examples include 1,3-dipropyleneurea, maleimide, N-methylmaleimide, N-ethylmaleimide, N-hydroxymaleimide, 1,4-bismaleimidobutane, 1,6-bismaleimidohexane, 1,8-bismaleimidooctane and N-carboxyheptylmaleimide.

The molecular weight of the imide compound is preferably within a range from 60 to 5,000, more preferably from 70 to 1,000, and still more preferably from 80 to 500.

The amount of the imide compound is preferably within a range from 10 to 10,000 parts by mass, and more preferably from 50 to 5,000 parts by mass, per 100 parts by mass of the combination of the π-conjugated conductive polymer and the polyanion. If the amounts of the amide compound and the imide compound are less than the lower limits of the respective ranges mentioned above, then the effects achieved by adding the amide compound and/or the imide compound tend to diminish, which is undesirable. In contrast, if the amounts exceed the upper limits of the respective ranges, then the conductivity tends to decrease as a result of a reduction in the concentration of the n-conjugated conductive polymer, which is also undesirable.

—Lactam Compounds

A lactam compound is an intramolecular cyclic amide of an aminocarboxylic acid, and is a compound in which a portion of the ring can be represented by —CO—NR— (wherein R is a hydrogen atom or an arbitrary substituent). One or more of the carbon atoms within the ring may be unsaturated or substituted for a hetero atom.

Examples of the lactam compound include pentano-4-lactam, 4-pentanelactam-5-methyl-2-pyrrolidone, 5-methyl-2-pyrrolidinone, hexano-6-lactam, and 6-hexanelactam.

The amount of the lactam compound is preferably within a range from 10 to 10,000 parts by mass, and more preferably from 50 to 5,000 parts by mass, per 100 parts by mass of the combination of the π-conjugated conductive polymer and the polyanion. If the amount added of the lactam compound is less than the lower limit of the above range, then the effects achieved by adding the lactam compound tend to diminish, which is undesirable. In contrast, if the amount exceeds the upper limit of the above range, then the conductivity tends to decrease as a result of the reduction in the concentration of the π-conjugated conductive polymer, which is also undesirable.

—Compounds Containing a Glycidyl Group

Examples of the compound containing a glycidyl group include glycidyl compounds such as ethyl glycidyl ether, butyl glycidyl ether, t-butyl glycidyl ether, allyl glycidyl ether, benzyl glycidyl ether, glycidyl phenyl ether, bisphenol A diglycidyl ether, glycidyl ether acrylate and glycidyl ether methacrylate.

The amount of the compound containing a glycidyl group is preferably within a range from 10 to 10,000 parts by mass, and more preferably from 50 to 5,000 parts by mass, per 100 parts by mass of the combination of the π-conjugated conductive polymer and the polyanion. If the amount added of the compound containing a glycidyl group is less than the lower limit of the above range, then the effects achieved by adding the compound containing a glycidyl group tend to diminish, which is undesirable. In contrast, if the amount exceeds the upper limit of the above range, then the conductivity tends to decrease as a result of the reduction in the concentration of the π-conjugated conductive polymer, which is also undesirable.

—Silane Coupling Agent

Specific examples of the silane coupling agent include vinyltrichlorosilane, vinyltrimethoxysilane, vinyltriethoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxypropyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-2-(aminoethyl)-3-aminopropylmethyldimethoxysilane, N-2-(aminoethyl)-3-aminopropyltriethoxysilane, N-2-(aminoethyl)-3-aminopropyltrimethoxysilane, 3-aminopropyltrimethoxysilane, 3-aminotriethoxysilane, 3-triethoxysilyl-N-(1,3-dimethylbutylidene)propylamine, N-phenyl-3-aminopropyltrimethoxysilane, N-(vinylbenzyl)-2-aminoethyl-3-aminopropyltrimethoxysilane hydrochloride, 3-ureidopropyltriethoxysilane, 3-chloropropyltrimethoxysilane, 3-mercaptopropylmethyldimethoxysilane, 3-mercaptopropyltrimethoxysilane, bis(triethoxysilylpropyl)tetrasulfide and 3-isocyanatopropyltriethoxysilane.

There are no particular limitations on the amount of the silane coupling agent, and any amount may be added as required. An amount within a range from 10 to 10,000 parts by mass per 100 parts by mass of the combination of the vπ-conjugated conductive polymer and the polyanion is preferred.

—Water-Soluble Organic Solvents

Examples of the water-soluble organic solvent include polar solvents such as N-methyl-2-pyrrolidone, N-methylacetamide, N,N-dimethylformamide, N,N-dimethylacetamide, dimethylsulfoxide, hexamethylene phosphortriamide, N-vinylpyrrolidone, N-vinylformamide and N-vinylacetamide, phenols such as cresol, phenol and xylenol, polyhydric aliphatic alcohols such as ethylene glycol, propylene glycol, dipropylene glycol, 1,3-butylene glycol, 1,4-butylene glycol, D-glucose, D-glucitol, isoprene glycol, butanediol, 1,5-pentanediol, 1,6-hexanediol, 1,9-nonanediol and neopentyl glycol, carbonate compounds such as ethylene carbonate and propylene carbonate, ether compounds such as dioxane and diethyl ether, chain-like ethers such as ethylene glycol dialkyl ethers, propylene glycol dialkyl ethers, polyethylene glycol dialkyl ethers and polypropylene glycol dialkyl ethers, heterocyclic compounds such as 3-methyl-2-oxazolidinone, and nitrile compounds such as acetonitrile, glutaronitrile, methoxyacetonitrile, propionitrile and benzonitrile. These solvents may be used either individually, or as mixtures containing two or more different solvents. <Electrolyte Solution>

In the capacitor 10, if necessary, an electrolyte solution may be included between the dielectric layer 12 and the cathode 13. There are no particular limitations on the electrolyte solution provided it has a high degree of conductivity, and examples include solutions formed by dissolving conventional electrolytes in conventional electrolyte solution solvents.

Examples of the solvent for the electrolyte solution include alcohol-based solvents such as ethylene glycol, diethylene glycol, propylene glycol, 1,4-butanediol and glycerol, lactone-based solvents such as γ-butyrolactone, γ-valerolactone and δ-valerolactone, amide solvents such as N-methylformamide, N,N-dimethylformamide, N-methylacetamide and N-methylpyrrolidinone, nitrile solvents such as acetonitrile and 3-methoxypropionitrile, and water and the like.

Examples of the electrolyte include those comprising an anion component composed of an organic acid such as adipic acid, glutaric acid, succinic acid, benzoic acid, isophthalic acid, phthalic acid, terephthalic acid, maleic acid, toluic acid, enanthic acid, malonic acid, formic acid, a decanedicarboxylic acid such as 1,6-decanedicarboxylic acid or 5,6-decanedicarboxylic acid, an octanedicarboxylic acid such as 1,7-octanedicarboxylic acid, azelaic acid or sebacic acid, or an inorganic acid such as boric acid, a boric acid polyhydric alcohol complex compound obtained from boric acid and a polyhydric alcohol, phosphoric acid, carbonic acid or silicic acid; and a cation component composed of a primary amine (such as methylamine, ethylamine, propylamine, butylamine or ethylenediamine), a secondary amine (such as dimethylamine, diethylamine, dipropylamine, methylethylamine or diphenylamine), a tertiary amine (such as trimethylamine, triethylamine, tripropylamine, triphenylamine or 1,8-diazabicyclo(5,4,0)-undecene-7), or a tetraalkylammonium (such as tetramethylammonium, tetraethylammonium, tetrapropylammonium, tetrabutylammonium, methyltriethylammonium or dimethyldiethylammonium).

The capacitor 10 described above exhibits reduced leakage current as a result of applying a direct current voltage between the anode 11 and the cathode 13. Specifically, with the capacitor 10, the leakage current I can be reduced to a value less than 0.03 CV, preferably less than 0.01 CV, and more preferably less than 0.005 CV. In this description, I represents the current after application of the rated voltage at room temperature for 2 minutes, C represents the capacitance at room temperature, and V represents the rated voltage value for the solid electrolytic capacitor.

Further, as described below, the capacitor 10 can be formed from a conductive polymer solution containing a π-conjugated conductive polymer and a polyanion, without performing an electrolytic polymerization or chemical oxidative polymerization.

As a result, the conductivity of the capacitor 10 can be increased, and the capacitor 10 can be manufactured with a high level of productivity. Moreover, in the capacitor 10, because the π-conjugated conductive polymer penetrates deeply into the interior of the dielectric layer 12, the capacitance increases.

[Method for Manufacturing Capacitor]

Next is a description of an embodiment of the method for manufacturing a capacitor according to the present invention.
<Electrolytic Oxidation Step>

In the method for manufacturing the capacitor 10 according to the present embodiment, first, in an electrolytic oxidation step, the surface of the anode 11 formed from a valve metal is electrolytically oxidized to effect a chemical conversion treatment and form the dielectric layer 12.

Examples of the method used for electrolytically oxidizing the surface of the anode 11 include a method in which the surface of the anode 11 is subjected to anodic oxidation by application of a voltage within an electrolyte solution such as an aqueous solution of ammonium adipate.
<Cathode Positioning Step>

Next, the cathode 13 formed from a conductor such as an aluminum foil is positioned in an opposing arrangement on the surface of the dielectric layer 12 with the separator 15 disposed therebetween.
<Solid Electrolyte Formation Step>

Subsequently, in a solid electrolyte formation step, the solid electrolyte layer 14 containing the π-conjugated conductive polymer and the polyanion is formed between the dielectric layer 12 and the cathode 13.

Examples of the method used for forming the solid electrolyte layer 14 include a method in which the element containing the dielectric layer 12 and the cathode 13 is dipped in the conductive polymer solution, a method in which the conductive polymer solution is applied to the surface of the dielectric layer 12 using a conventional coating device, and a method in which the conductive polymer solution is sprayed onto the surface of the dielectric layer 12 using a conventional spraying device. Further, if required, the dipping or application may be performed under reduced pressure.

Following dipping within, or application of, the conductive polymer solution, the solution is preferably dried using a conventional drying method such as hot air drying.

The conductive polymer solution can be obtained by subjecting a precursor monomer to the π-conjugated conductive polymer to polymerization in the presence of the polyanion.

In a specific example of subjecting a precursor monomer to the π-conjugated conductive polymer to polymerization in the presence of the polyanion, the polyanion is first dissolved in a solvent capable of dissolving the polyanion, and the precursor monomer to the π-conjugated conductive polymer is then added to the resulting solution. Subsequently, an oxidant is added, the precursor monomer is polymerized, and the crude product is purified by removing any excess oxidant and precursor monomer, thus yielding the conductive polymer solution.

By conducting the polymerization in this manner, the π-conjugated conductive polymer grows in such as a manner as to form a salt with the polyanion. Accordingly, the resulting π-conjugated conductive polymer forms a complex with the polyanion.

Examples of the precursor monomer to the π-conjugated conductive polymer include pyrroles and derivatives thereof, thiophenes and derivatives thereof, and anilines and derivatives thereof.

As the oxidant, any compound capable of oxidizing the precursor monomer to form the π-conjugated conductive polymer may be used, and specific examples include peroxodisulfates such as ammonium peroxodisulfate (ammonium persulfate), sodium peroxodisulfate (sodium persulfate) and potassium peroxodisulfate (potassium persulfate), transition metal compounds such as ferric chloride, ferric sulfate, ferric nitrate and cupric chloride, metal halide compounds such as boron trifluoride and aluminum chloride, metal oxides such as silver oxide and cesium oxide, peroxides such as hydrogen peroxide and ozone, organic peroxides such as benzoyl peroxide, and oxygen and the like.

There are no particular restrictions on the solvent used in producing the π-conjugated conductive polymer, and any solvent capable of dissolving or dispersing the aforementioned precursor monomer, and also able to retain the oxidizing power of the oxidant may be used.

Specifically, water and/or organic solvents may be used as the solvent. Examples of organic solvents that may be used include polar solvents such as N-methyl-2-pyrrolidone, N,N-dimethylformamide, N,N-dimethylacetamide, dimethylsulfoxide, hexamethylene phosphortriamide, N-vinylpyrrolidone, N-vinylformamide and N-vinylacetamide, phenols such as cresol, phenol and xylenol, alcohols such as methanol, ethanol, propanol and butanol, polyhydric aliphatic alcohols such as ethylene glycol, diethylene glycol, triethylene glycol, propylene glycol, dipropylene glycol, 1,3-butylene glycol, 1,4-butylene glycol, glycerol, diglycerol, D-glucose, D-glucitol, isoprene glycol, butanediol, 1,5-pentanediol, 1,6-hexanediol, 1,9-nonanediol and neopentyl glycol, ketones such as acetone and methyl ethyl ketone, hydrocarbons such as hexane, benzene and toluene, carboxylic acids such as formic acid and acetic acid, carbonate compounds such as ethylene carbonate and propylene carbonate, ether compounds such as dioxane and diethyl ether, chain-like ethers such as ethylene glycol dialkyl ethers, propylene glycol dialkyl ethers, polyethylene glycol dialkyl ethers and polypropylene glycol dialkyl ethers, heterocyclic compounds such as 3-methyl-2-oxazolidinone, and nitrile compounds such as acetonitrile, glutaronitrile, methoxyacetonitrile, propionitrile and benzonitrile. These solvents may be used individually, as mixtures containing two or more of the above solvents, or as mixtures with other organic solvents.

Of these solvents, in terms of minimizing the environmental impact, water or an alcohol-based solvent is preferred.

<Application Step>

Subsequently, in an application step, a treatment is performed in which a direct current voltage is applied between the anode 11 and the cathode 13, thus yielding the capacitor 10.

Although there are no particular limitations on the direct current voltage that is applied, in terms of minimizing the leakage current, the applied direct current voltage is preferably not less than 30%, more preferably not less than 50%, and most preferably 80% or more, of the rated voltage of the obtained capacitor 10. Here, the "rated voltage" is a value determined by factors such as the applied voltage during the catalytic oxidation of the anode (namely, the formation voltage). The rated voltage is usually no higher than the formation voltage.

Further, in order to further reduce the leakage current, the voltage applied during the application step is preferably not less than 20%, more preferably not less than 30%, and most preferably 40% or more, of the formation voltage used during the electrolytic oxidation step.

In order to minimize the leakage current, the atmospheric temperature during the application step is preferably not less than 30° C., more preferably within a range from 40 to 200° C., still more preferably from 80 to 180° C., and most preferably from 100 to 160° C.

The time of the application step is adjusted appropriately in accordance with the magnitude of the applied direct current voltage and the atmospheric temperature.

For example, in terms of achieving a further reduction in the leakage current, the application time is preferably lengthened as the magnitude of the applied direct current voltage is lowered. Specifically, in those cases where the applied direct current voltage is less than 50% of the rated voltage of the capacitor, the application time is preferably set to at least 5 minutes in order to minimize the leakage current.

In those cases where the applied direct current voltage is high, the application time may be shortened. Specifically, in those cases where the applied direct current voltage is at least 50% of the rated voltage of the capacitor, the leakage current can be satisfactorily reduced even if the voltage application time is less than 5 minutes.

Further, in terms of achieving a further reduction in the leakage current, the application time is preferably lengthened as the atmospheric temperature is lowered. If the atmospheric temperature is high, then the application time may be shortened.

The application step may also be performed within a solution containing an organic solvent and a salt. If the application step is performed within a solution containing an organic solvent and a salt, then the reparative properties of the anode 11 are enhanced, enabling a further reduction in the leakage current.

Examples of solvents that can be used as the organic solvent include the same organic solvents as those listed above for use in the production of the π-conjugated conductive polymer.

Further, examples of the cation for forming the salt include a lithium ion, sodium ion, potassium ion, calcium ion, magnesium ion, ammonium ion, imidazolium ion, alkylammonium ion and pyridinium ion.

Examples of the anion for forming the salt include a sulfate ion, sulfite ion, chloride ion, nitrate ion, nitrite ion, phosphate ion, phosphite ion, carboxylate ion, sulfonate ion, hydroxide ion and carbonate ion.

Examples of specific salts include ammonium sulfate, ammonium 4-sulfophthalate, imidazolium 5-sulfoisophthalate, lithium 5-sulfoisophthalate, ammonium benzoate, sodium dodecylbenzenesulfonate, ammonium adipate, ammonium para-toluenesulfonate, ethylmethylimidazolium trifluoromethanesulfonate, ammonium trifluorosulfonate, diammonium phthalate, ditetraethylmethylammonium phthalate, ammonium succinate, tetramethylammonium maleate, methylethylimidazolium benzoate, triethanolammonium para-styrenesulfonate, triethylmethylammonium isophthalate, diethylethanolammonium para-toluenesulfonate, methylethylimidazolium 4-sulfophthalate, potassium hydroquinonesulfonate and ammonium 2,4-dihydroxybenzoate.

Of the above salts, in terms of maximizing the increase in the capacitance and the reduction in the ESR, a salt of a nitrogen-containing cation and an anion is preferred, and an ammonium salt or imidazolium salt is particularly desirable.

Specific examples of ammonium salts include ammonium sulfate, ammonium 4-sulfophthalate, ammonium benzoate, ammonium adipate, ammonium trifluorosulfonate, diammonium phthalate, ditetraethylmethylammonium phthalate, ammonium succinate, tetramethylammonium maleate, triethanolammonium para-styrenesulfonate, triethylmethylammonium isophthalate, diethylethanolammonium para-toluenesulfonate and ammonium 2,4-dihydroxybenzoate.

Specific examples of imidazolium salts include imidazolium 5-sulfoisophthalate, ethylmethylimidazolium trifluoromethanesulfonate and methylethylimidazolium 4-sulfophthalate.

By employing the above manufacturing method in which a direct current voltage is applied between the anode 11 and the cathode 13 during the application step, the leakage current can be reduced.

Further, in the above manufacturing method in which the solid electrolyte layer 14 is formed using a conductive polymer solution, because neither an electrolytic polymerization nor a chemical oxidative polymerization need be conducted, the resulting conductivity is excellent. Accordingly, the ESR of the capacitor 10 can be reduced.

Furthermore, because the above manufacturing method is a method in which the solid electrolyte layer 14 is formed using a solution containing a π-conjugated conductive polymer, the capacitor 10 can be manufactured at a high level of productivity.

Moreover, in the above manufacturing method in which the solid electrolyte layer 14 is formed between the dielectric layer 12 and the cathode 13 using a conductive polymer solution, the conductive polymer solution is able to penetrate deeply into the interior of the dielectric layer 12. Accordingly, the solid electrolyte layer 14 is able to be formed across a broad area, meaning the capacitance of the capacitor 10 can be increased.

The present invention is not limited to the embodiments described above.

For example, in the present invention, the separator 15 may be omitted. However, in terms of facilitating preparation of the capacitor 10, inclusion of the separator 15 is preferred.

EXAMPLES

A more detailed description of the present invention is presented below based on a series of examples.

(1) Preparation of Conductive Polymer Solutions

Preparation Example 1

Preparation of Conductive Polymer Solution (I)

14.2 g of 3,4-ethylenedioxythiophene and a solution prepared by dissolving 42.6 g of a polystyrenesulfonic acid (weight average molecular weight: approximately 150,000) in 2,000 ml of ion-exchanged water were mixed at 20° C.

With the thus obtained mixed solution undergoing constant stirring at 20° C., an oxidation catalyst solution containing 29.64 g of ammonium persulfate and 8.0 g of ferric sulfate dissolved in 200 ml of ion-exchanged water was added, and the resulting mixture was then stirred and reacted for 3 hours.

The resulting reaction mixture was subjected to a dialysis treatment, thereby removing the unreacted monomer and oxidant, and yielding an aqueous solution containing approximately 1.5% by mass of a polystyrenesulfonic acid-poly(3,4-ethylenedioxythiophene).

6 g of polyethylene glycol 400 and 0.8 g of imidazole were added to, and dispersed within, 100 g of the aqueous solution of polystyrenesulfonic acid-poly(3,4-ethylenedioxythiophene), thus yielding a conductive polymer solution (I).

Preparation Example 2

Preparation of Conductive Polymer Solution (II)

With the exception of adding and dispersing 0.5 g of a polyester aqueous solution (solid fraction concentration: 25% by mass, PLASCOAT 561, manufactured by Goo Chemical Co., Ltd.) within 10 g of the conductive polymer solution (I) obtained in preparation example 1, a conductive polymer solution (II) was obtained in the same manner as preparation example 1.

Preparation Example 3

Preparation of Conductive Polymer Solution (III)

With the exception of adding and dispersing 0.3 g of hydroxyethylacrylamide within 10 g of the conductive polymer solution (I) obtained in preparation example 1, a conductive polymer solution (III) was obtained in the same manner as preparation example 1.

Preparation Example 4

Preparation of Conductive Polymer Solution (IV)

With the exception of adding and dispersing 0.3 g of triethylene glycol within 10 g of the conductive polymer solution (I) obtained in preparation example 1, a conductive polymer solution (IV) was obtained in the same manner as preparation example 1.

Preparation Example 5

Preparation of Conductive Polymer Solution (V)

With the exception of adding and dispersing 0.5 g of a polyurethane aqueous solution (solid fraction concentration: 25% by mass, manufactured by Kusumoto Chemicals, Ltd.) within 10 g of the conductive polymer solution (I) obtained in preparation example 1, a conductive polymer solution (V) was obtained in the same manner as preparation example 1.

Preparation Example 6

Preparation of Conductive Polymer Solution (VI)

With the exception of altering the amount of the polyethylene glycol added to 100 g of the aqueous solution of polystyrenesulfonic acid-poly(3,4-ethylenedioxythiophene) to 1.5 g, a conductive polymer solution (VI) was obtained in the same manner as preparation example 1.

Preparation Example 7

Preparation of Conductive Polymer Solution (VII)

2 g of 3,4-ethylenedioxythiophene, 6 g of iron (III) p-toluenesulfonate and 8 g of butanol were mixed together to obtain a conductive polymer solution (VII).

(3) Manufacture of capacitors

Manufacturing Example 1

An anode lead terminal was connected to an etched aluminum foil (an anode foil), and in an electrolytic oxidation step, was then subjected to a chemical conversion treatment (an electrolytic oxidation treatment) by applying a voltage within a 10% by mass aqueous solution of ammonium adipate, thereby forming a dielectric layer on both surfaces of the aluminum foil and yielding an anode foil. The voltage applied during this electrolytic oxidation step (the formation voltage) was 82 V.

Next, opposing aluminum cathode foils with a cathode lead terminal welded thereto were laminated to both surfaces of the anode foil with a cellulose separator disposed therebetween, and the resulting laminate was then wound into a circular cylindrical shape to form a capacitor element.

Manufacturing Example 2

With the exception of altering the formation voltage to 102 V, a capacitor element was obtained in the same manner as manufacturing example 1.

Manufacturing Example 3

With the exception of altering the formation voltage to 63 V, a capacitor element was obtained in the same manner as manufacturing example 1.

Example 1

The capacitor element obtained in manufacturing example 1 was dipped, under reduced pressure conditions, in the conductive polymer solution (I) prepared in preparation example 1, and was subsequently dried for 30 minutes at 120° C. using a hot air dryer. Subsequently, this operation of dipping the capacitor element in the conductive polymer solution (I) was repeated a further 2 times, thereby forming a solid electrolyte layer containing a π-conjugated conductive polymer and a polyanion between the dielectric layer and the cathode.

Next, the capacitor element with the solid electrolyte layer formed thereon was packed in an aluminum case and sealed with a sealing rubber.

Subsequently, in an application step, a direct current voltage of 35 V was applied between the anode and the cathode for 30 minutes within an atmosphere of 105° C., thus completing preparation of a capacitor.

The initial values of the capacitance at 120 Hz and the ESR at 100 kHz for the prepared capacitor were measured using an LCZ meter 2345 (manufactured by NF Corporation). Further, using a stabilized power source, a direct current voltage of 35 V was applied between the anode and the cathode of the capacitor for 2 minutes, and the leakage current was measured. These results are shown in Table 1. The ESR is an indicator of the impedance.

Example 2

With the exception of altering the direct current voltage applied between the anode and the cathode to 20 V, a capacitor was prepared in the same manner as example 1. The capacitance, ESR and leakage current were then measured in the same manner as example 1. The results are shown in Table 1.

Example 3

With the exception of altering the direct current voltage applied between the anode and the cathode to 60 V, a capacitor was prepared in the same manner as example 1. The capacitance, ESR and leakage current were then measured in the same manner as example 1. The results are shown in Table 1.

Example 4

With the exception of altering the atmospheric temperature during application of the direct current voltage between the anode and the cathode to a temperature of 80° C., a capacitor was prepared in the same manner as example 1. The capacitance, ESR and leakage current were then measured in the same manner as example 1. The results are shown in Table 1.

Example 5

With the exception of altering the atmospheric temperature during application of the direct current voltage between the anode and the cathode to a temperature of 125° C., a capacitor was prepared in the same manner as example 1. The capacitance, ESR and leakage current were then measured in the same manner as example 1. The results are shown in Table 1.

Example 6

With the exception of altering the atmospheric temperature during application of the direct current voltage between the anode and the cathode to a temperature of 150° C., a capacitor was prepared in the same manner as example 1. The capacitance, ESR and leakage current were then measured in the same manner as example 1. The results are shown in Table 1.

Example 7

With the exception of packing an electrolyte solution (10% by mass solution of ammonium adipate in γ-butyrolactone) inside the aluminum case together with the capacitor element having the solid electrolyte layer formed thereon, a capacitor was prepared in the same manner as example 1. The capacitance, ESR and leakage current were then measured in the same manner as example 1. The results are shown in Table 1.

Example 8

With the exception of using the conductive polymer solution (II) instead of the conductive polymer solution (I), a capacitor was prepared in the same manner as example 1. The capacitance, ESR and leakage current were then measured in the same manner as example 1. The results are shown in Table 1.

Example 9

With the exception of using the conductive polymer solution (III) instead of the conductive polymer solution (I), a capacitor was prepared in the same manner as example 1. The capacitance, ESR and leakage current were then measured in the same manner as example 1. The results are shown in Table 1.

Example 10

With the exception of using the conductive polymer solution (IV) instead of the conductive polymer solution (I), a capacitor was prepared in the same manner as example 1. The capacitance, ESR and leakage current were then measured in the same manner as example 1. The results are shown in Table 1.

Example 11

With the exception of using the conductive polymer solution (V) instead of the conductive polymer solution (I), a capacitor was prepared in the same manner as example 1. The capacitance, ESR and leakage current were then measured in the same manner as example 1. The results are shown in Table 1.

Example 12

With the exception of using the conductive polymer solution (VI) instead of the conductive polymer solution (I), a capacitor was prepared in the same manner as example 1. The capacitance, ESR and leakage current were then measured in the same manner as example 1. The results are shown in Table 1.

Example 13

With the exceptions of using the capacitor element obtained in manufacturing example 2 instead of the capacitor element obtained in manufacturing example 1, and altering the applied voltage during the application step to 50 V, a capacitor was prepared in the same manner as example 1. The capacitance, ESR and leakage current were then measured in the same manner as example 1. The results are shown in Table 1.

Example 14

With the exception of altering the applied voltage during the application step to 63 V, a capacitor was prepared in the same manner as example 13. The capacitance, ESR and leakage current were then measured in the same manner as example 1. The results are shown in Table 1.

Example 15

With the exception of using the capacitor element obtained in manufacturing example 3 instead of the capacitor element obtained in manufacturing example 1, a capacitor was prepared in the same manner as example 1. The capacitance, ESR and leakage current were then measured in the same manner as example 1. The results are shown in Table 1.

Comparative Example 1

With the exception of not applying a direct current voltage between the anode and the cathode during preparation of the capacitor of example 1, a capacitor was prepared in the same manner as example 1. The capacitance, ESR and leakage current were then measured in the same manner as example 1. The results are shown in Table 1.

Comparative Example 2

A capacitor element was dipped, under reduced pressure conditions, in the conductive polymer solution (VII) prepared in preparation example 7, and was then heated for 30 minutes at 60° C. using a hot air dryer to effect a chemical oxidative polymerization. This resulted in the formation of a solid electrolyte layer containing a π-conjugated conductive polymer between the dielectric layer and the cathode.

Next, the capacitor element with the solid electrolyte layer formed thereon was packed in an aluminum case and sealed with a sealing rubber.

Subsequently, a direct current voltage of 35 V was applied between the anode and the cathode for 30 minutes within an atmosphere of 105° C., thus completing preparation of a capacitor.

The capacitance, ESR and leakage current for the thus obtained capacitor were then measured in the same manner as example 1. The results are shown in Table 1.

TABLE 1

|  |  | Ratio of applied voltage during application step relative to formation voltage during electrolytic oxidation step (%) | Capacitance (μF) | ESR (mΩ) | Leakage current (μA) |
|---|---|---|---|---|---|
| Example | 1 | 42 | 145 | 12 | 2.5 |
|  | 2 | 21 | 145 | 12 | 6 |
|  | 3 | 73 | 144 | 11 | 2 |
|  | 4 | 42 | 145 | 12 | 5 |
|  | 5 | 42 | 144 | 12 | 1 |
|  | 6 | 42 | 143 | 13 | 1 |
|  | 7 | 42 | 147 | 11 | 1 |
|  | 8 | 42 | 142 | 14 | 2 |
|  | 9 | 42 | 147 | 11 | 2 |
|  | 10 | 42 | 147 | 11 | 2 |
|  | 11 | 42 | 143 | 13 | 2 |
|  | 12 | 42 | 132 | 16 | 30 |
|  | 13 | 49 | 55 | 19 | 1.5 |
|  | 14 | 62 | 54 | 19.5 | 0.5 |
|  | 15 | 56 | 198 | 13 | 6 |
| Comparative example | 1 | — | 52 | 125 | 520 |
|  | 2 | 42 | 142 | 11 | Not measurable (short-circuit) |

The capacitors of examples 1 to 15 for which a direct current voltage had been applied between the anode and the cathode exhibited low values for both the ESR and the leakage current. Moreover, the capacitance values for the capacitors of examples 1 to 15 were large.

In contrast, in the case of the capacitor of comparative example 1, in which a direct current voltage was not applied between the anode and the cathode, the ESR and the leakage current were large. Moreover, the capacitor of comparative example 1 also had a small capacitance.

Further, in the case of the capacitor of comparative example 2 in which the solid electrolyte layer was formed by chemical oxidative polymerization, a short circuit occurred when a direct current voltage was applied during measurement of the leakage current.

INDUSTRIAL APPLICABILITY

The capacitor of the present invention exhibits a high degree of conductivity and minimal leakage current, and can be obtained with a high level of productivity. A method for manufacturing a capacitor according to the present invention enables a capacitor having a high degree of conductivity and minimal leakage current to be obtained with a high level of productivity, and can therefore be used in the manufacture of electronic equipment and the like.

DESCRIPTION OF THE REFERENCE SYMBOLS

| | | |
|---|---|---|
| 10 | Capacitor | |
| 11 | Anode | |
| 12 | Dielectric layer | |
| 13 | Cathode | |
| 14 | Solid electrolyte layer | |
| 15 | Separator | |

What is claimed is:

1. A capacitor comprising
an anode made of a valve metal,
a dielectric layer formed by oxidizing a surface of said anode,
a cathode made of a conductor, and
a solid electrolyte layer that is formed between said dielectric layer and said cathode and comprises a π-conjugated conductive polymer and a polyanion, wherein
a treatment is performed in which a direct current voltage is applied between said anode and said cathode,
said direct current voltage during said treatment is not less than 20% of a formation voltage of said dielectric, and
said capacitor exhibits a leakage current I of less than 0.03CV, provided that I represents the current after application of the rated voltage at room temperature for 2 minutes, C represents the capacitance at room temperature, and V represents the rated voltage value for the solid electrolytic capacitor.

2. The capacitor according to claim 1, wherein said solid electrolyte layer further comprises a resin component besides said π-conjugated conductive polymer and said polyanion.

3. The capacitor according to claim 2, wherein said direct current voltage during said treatment is not less than 50% of a rated voltage of an obtained capacitor.

4. The capacitor according to claim 2, wherein said direct current voltage during said treatment is from 50% to 180% of a rated voltage of an obtained capacitor.

5. The capacitor according to claim 2, wherein said solid electrolyte layer is formed from a conductive polymer solution comprising π-conjugated conductive polymer and a polyanion.

6. The capacitor according to claim 5, wherein said conductive polymer solution comprises a (co)polymer composed of any one or two compounds selected from the group consisting of polypyrrole, polythiophene, poly(N-methylpyrrole), poly(3-methylthiophene), poly(-methoxythiophene) and poly(3,4-ethylenedioxythiophene); and polystyrene sulfonic acid.

7. The capacitor according to claim 5, wherein said conductive polymer solution comprises poly(3,4-ethylenedioxythiophene) and polystyrene sulfonic acid.

8. The capacitor according to claim 1, wherein said direct current voltage during said treatment is not less than 50% of a rated voltage of an obtained capacitor.

9. The capacitor according to claim 1, wherein said direct current voltage during said treatment is from 50% to 180% of a rated voltage of an obtained capacitor.

10. The capacitor according to claim 1, wherein said solid electrolyte layer is formed from a conductive polymer solution comprising a π-conjugated conductive polymer and a polyanion.

11. The capacitor according to claim 10, wherein said conductive polymer solution comprises a (co)polymer composed of any one or two compounds selected from the group consisting of polypyrrole, polythiophene, poly(N-methylpyrrole), poly(3-methylthiophene), poly(3-methoxythiophene) and poly(3,4-ethylenedioxythiophene); and polystyrene sulfonic acid.

12. The capacitor according to claim 10, wherein said conductive polymer solution comprises poly(3,4-ethylenedioxythiophene) and polystyrene sulfonic acid.

13. A method of manufacturing a capacitor, comprising:
an electrolytic oxidation step of forming a dielectric layer by electrolytically oxidizing a surface of an anode made of a valve metal,
a cathode positioning step of positioning a cathode made of a conductor in an opposing arrangement on a surface of said dielectric layer,
a solid electrolyte formation step of forming a solid electrolyte layer between said dielectric layer and said cathode using a conductive polymer solution comprising a π-conjugated conductive polymer and a polyanion, and
an application step of performing a treatment in which a direct current voltage is applied between said anode and said cathode, wherein
said current voltage during said application step is not less than 20% of a formation voltage of said dielectric, and said capacitor exhibits a leakage current I of less than 0.03 CV, provided that I represents the current after application of the rated voltage at room temperature for 2 minutes, C represents the capacitance at room temperature, and V represents the rated voltage value for the solid electrolytic capacitor.

14. The method of manufacturing a capacitor according to claim 13, wherein said direct current voltage in said application step is not less than 50% of a rated voltage of an obtained capacitor.

15. The method of manufacturing a capacitor according to claim 14, wherein said application step is performed under an atmosphere of not less than 35° C.

16. The method of manufacturing a capacitor according to claim 15, wherein said application step is performed within a solution comprising an organic solvent and a salt.

17. The method of manufacturing a capacitor according to claim 14, wherein said application step is performed within a solution comprising an organic solvent and a salt.

18. The method of manufacturing a capacitor according to claim 13, wherein said application step is performed under an atmosphere of not less than 35° C.

19. The method of manufacturing a capacitor according to claim 18, wherein said application step is performed within a solution comprising an organic solvent and a salt.

20. The method of manufacturing a capacitor according to claim 13, wherein said application step is performed within a solution comprising an organic solvent and a salt.

21. The method of manufacturing a capacitor according to claim 13, wherein said direct current voltage during said application step is from 50% to 180% of a rated voltage of an obtained capacitor.

* * * * *